United States Patent
Suzuki et al.

(10) Patent No.: US 6,329,816 B1
(45) Date of Patent: Dec. 11, 2001

(54) METHOD OF AND APPARATUS FOR MEASURING THE THICKNESS OF A MAGNETIC LAYER IN A MAGNETIC RECORDING MEDIUM

(75) Inventors: Kiyohito Suzuki; Takashi Ono, both of Odawara (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/464,399

(22) Filed: Dec. 16, 1999

(30) Foreign Application Priority Data

Dec. 24, 1998 (JP) .................................................. 10-368113
Jun. 4, 1999 (JP) .................................................. 11-158317

(51) Int. Cl.[7] ...................................................... G01B 7/06
(52) U.S. Cl. ........................................... 324/229; 324/330
(58) Field of Search ................................ 324/230, 229, 324/231, 237, 239; 427/10, 127, 128, 129, 130, 131, 132

(56) References Cited

U.S. PATENT DOCUMENTS

| | | | |
|---|---|---|---|
| 4,695,797 | * 9/1987 | Deutsch et al. | 324/230 |
| 4,937,093 | * 6/1990 | Chino et al. | 427/10 |
| 5,539,675 | * 7/1996 | Carrol, Sr. et al. | 702/170 |
| 5,729,133 | * 3/1998 | Sakai et al. | 324/237 |

* cited by examiner

*Primary Examiner*—Glenn W. Brown
*Assistant Examiner*—Subhash Zaveri
(74) *Attorney, Agent, or Firm*—Sughrue Mion, PLLC

(57) ABSTRACT

A measuring apparatus has a magnetizing head for magnetizing a magnetic layer of a specimen, and a detecting sensor for detecting a magnetization of a magnetized area which has been magnetized by the magnetizing head. The magnetization detected by the detecting sensor is supplied via a sensor amplifier to a controller. Based on the supplied magnetization, the controller determines the thickness of the magnetic layer from a magnetization to magnetic layer thickness conversion table or formula. The thickness of the magnetic layer can therefore be measured accurately in a short period of time.

20 Claims, 11 Drawing Sheets

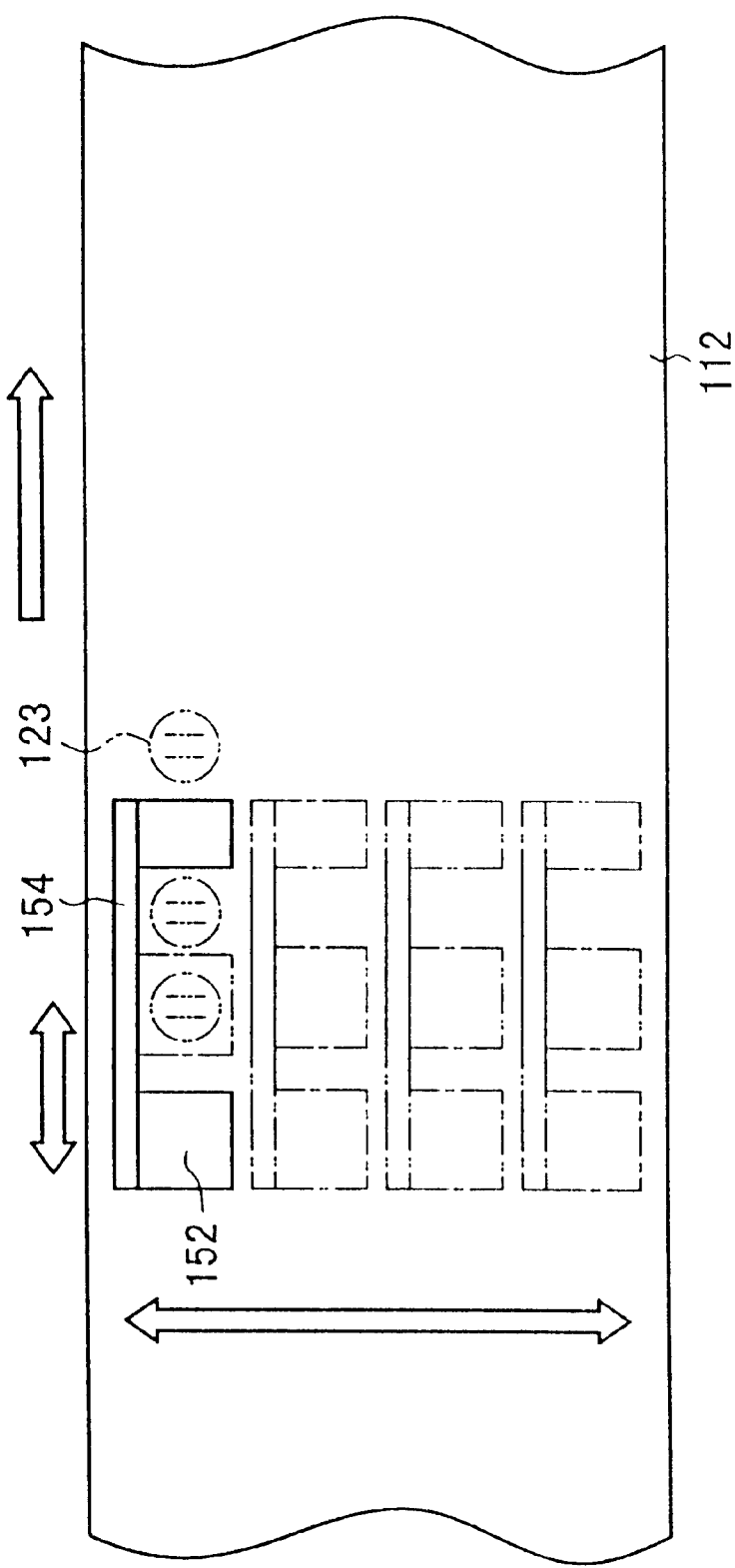

METHOD OF AND APPARATUS FOR MEASURING THE THICKNESS OF A MAGNETIC LAYER IN A MAGNETIC RECORDING MEDIUM

BACKGROUND OF THE INVENTION

1. Field of the Invention

The present invention relates to a method of and an apparatus for measuring the thickness of a magnetic layer of a magnetic recording medium or the like.

2. Description of the Related Art

There has heretofore been employed a process of measuring the thickness of a magnetic layer contained in a magnetic recording medium such as a magnetic tape (first measuring process) with a micrometer.

According to the first measuring process, the overall thickness of the magnetic recording medium is measured by the micrometer. Then, a magnetic layer, a back coat layer, etc. are removed from the magnetic recording medium using a suitable solvent, and the thickness of the remaining portion of the magnetic recording medium is measured by the micrometer. The measured thickness of the remaining portion is subtracted from the measured overall thickness of the magnetic recording medium to determine the thickness of the magnetic layer.

The recent trend of magnetic recording mediums is for their layers to be greatly reduced in thickness. According to the first measuring process, it is difficult to measure the thickness of such thin magnetic layers with sufficient accuracy. The first measuring process is also disadvantageous in that it takes a long period of time to measure the thickness of a magnetic layer because a destructive approach is employed to remove the magnetic layer, the back coat layer, etc. with the solvent.

Another process of measuring the thickness of a magnetic layer (second measuring process) is a non-destructive process using a radiation such as β-rays, γ-rays, X-rays, etc.

There are several types of the second measuring process, and they include a transmissive measuring process, a fluorescent X-ray measuring process, and a back scatter measuring process. These measuring processes determine the thickness of a magnetic layer based on an interaction between the radiation and the constituent substance of the magnetic layer.

Specifically, the mass per unit area of the constituent substance of the magnetic layer is measured from the interaction between the radiation and the constituent substance, and the mass is divided by the density of the constituent substance to determine the thickness of the magnetic layer.

The second measuring process needs to obtain a certain large sample for measuring the mass per unit area of the constituent substance of the magnetic layer. Therefore, the determined thickness of the magnetic layer represents an average thickness. It is thus difficult to achieve a sufficient resolution (spatial resolution) commensurate with an increase in the magnetic recording density in recent years.

SUMMARY OF THE INVENTION

It is therefore an object of the present invention to provide a method of and an apparatus for measuring the thickness of a magnetic layer of a magnetic recording medium accurately within a short period of time.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 11 is a plan view of a measuring apparatus for measuring the thickness of a magnetic layer according to a modification of the second embodiment.

DESCRIPTION OF THE PREFERRED EMBODIMENTS

Figure 1:
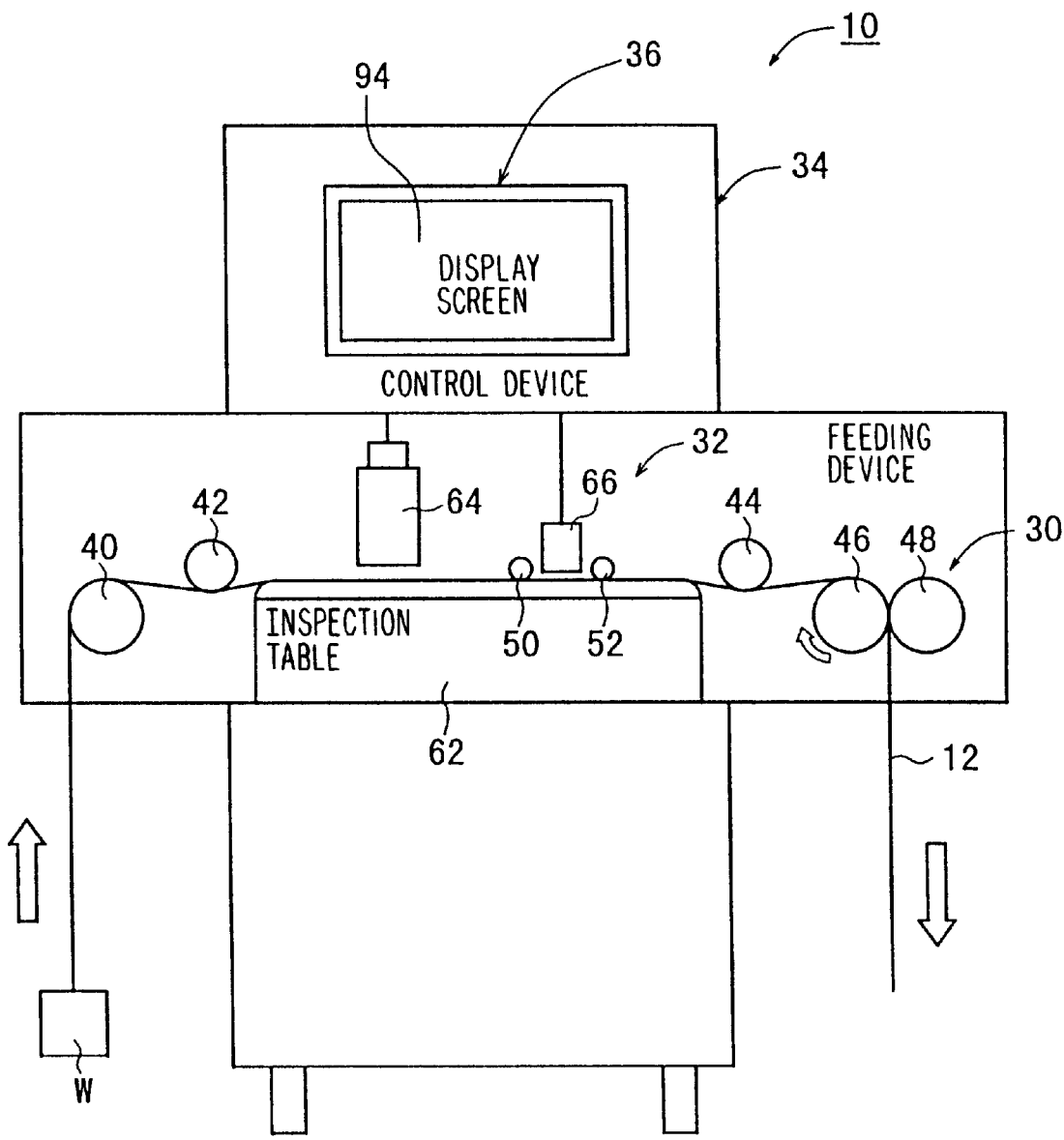
FIG. 1 is a schematic front elevational view of a measuring apparatus for measuring the thickness of a magnetic layer according to a first embodiment of the present invention.

Preferred embodiments of a method of measuring the thickness of a magnetic layer and a measuring apparatus for carrying the method will be described in detail below with reference to the accompanying drawings. Like or corresponding parts are denoted by like or corresponding reference characters throughout views.

A measuring apparatus for measuring the thickness of a magnetic layer according to a first embodiment of the present invention will first be described below.

Figure 2:
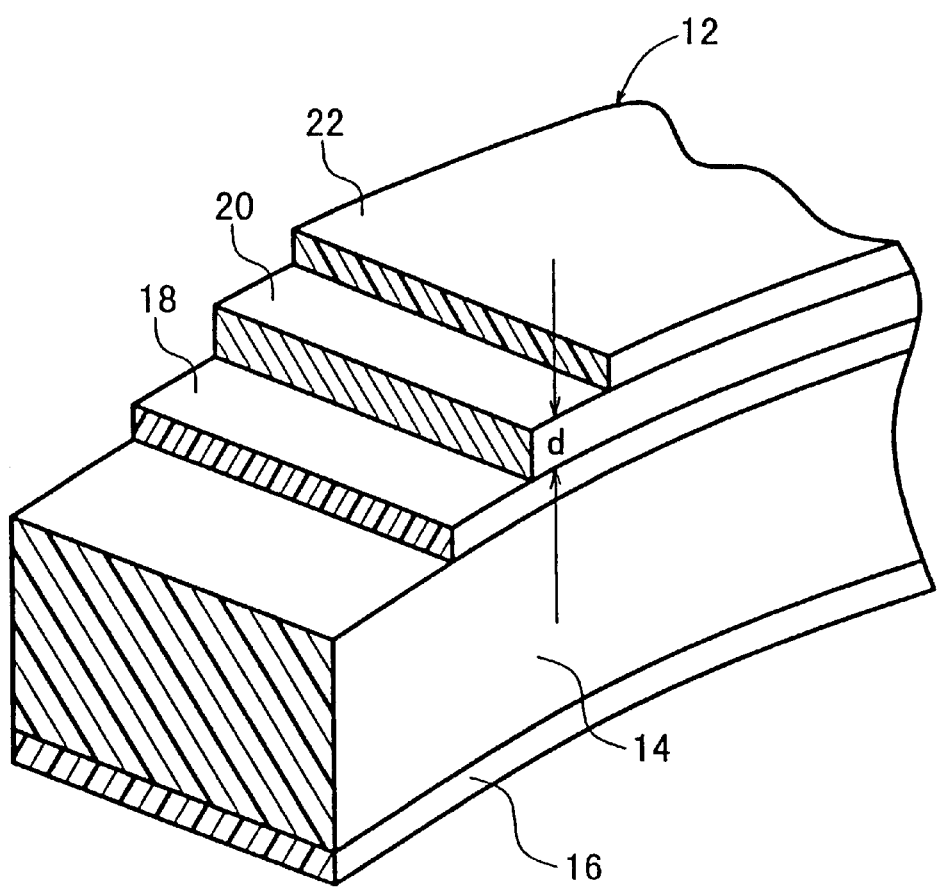
FIG. 2 is a fragmentary perspective view, partly cut away, of a magnetic tape as a type of magnetic recording medium.

FIG. 1 schematically shows a measuring apparatus 10 for measuring the thickness of a magnetic layer according to the first embodiment of the present invention. FIG. 2 shows a magnetic tape 12 as a type of magnetic recording medium which includes the magnetic layer whose thickness is to be measured.

As shown in FIG. 2, the magnetic tape 12 such as an audio tape, a video tape, etc. has a base film 14 comprising a polyethylene terephthalate (PET) film, a polyethylene naphthalate (PEN), etc.

The magnetic tape 12 also has a back coat layer 16 beneath the base film 14, an undercoat layer 18 over the base film 14, a magnetic layer 20 over the undercoat layer 18, and a protective lubricant layer 22 over the magnetic layer 20.

The squareness ratio (orientation uniformity) of the magnetic layer 20 should preferably be constant throughout the magnetic tape 12.

The magnetic recording medium to be measured by the measuring apparatus 10 includes a FD (floppy disk) in addition to the magnetic tape 12.

As shown in FIG. 1, the measuring apparatus 10 has a feeding device (feeding means) 30, a detecting device 32, a control device 34, and a display unit (display means) 36. The measuring apparatus 10 serves to measure the thickness d of the magnetic layer 20 of the magnetic tape 12 shown in FIG. 2.

The magnetic tape (hereinafter also referred to as a "specimen") 12 is a sample cut off from a wide magnetic sheet, i.e., a magnetic sheet from which narrow magnetic tapes will be cut as products or intermediate products, at a predetermined width along the transverse direction of the magnetic sheet.

The feeding device 30 has path rolls 40, 42 disposed upstream of the detecting device 32 in the direction in which the specimen 12 is fed, and a path roll 44 and a drive roll 46 which are disposed downstream of the detecting device 32 in the same direction.

A presser roll 48 is pressed against the drive roll 46, with the specimen 12 sandwiched between the drive roll 46 and the presser roll 48. The feeding device 30 also has a pair of spaced presser rolls 50, 52 for pressing the specimen 12 against an upper surface of an inspection table 62 (described later on) of the detecting device 32.

The drive shaft of an actuator, e.g., an electric motor, is connected to the drive roll 46. The actuator and a device, such as a speed reducer, interconnecting the actuator and the drive roll 46 jointly make up a roll drive mechanism 60 (see FIG. 3).

Figure 3:
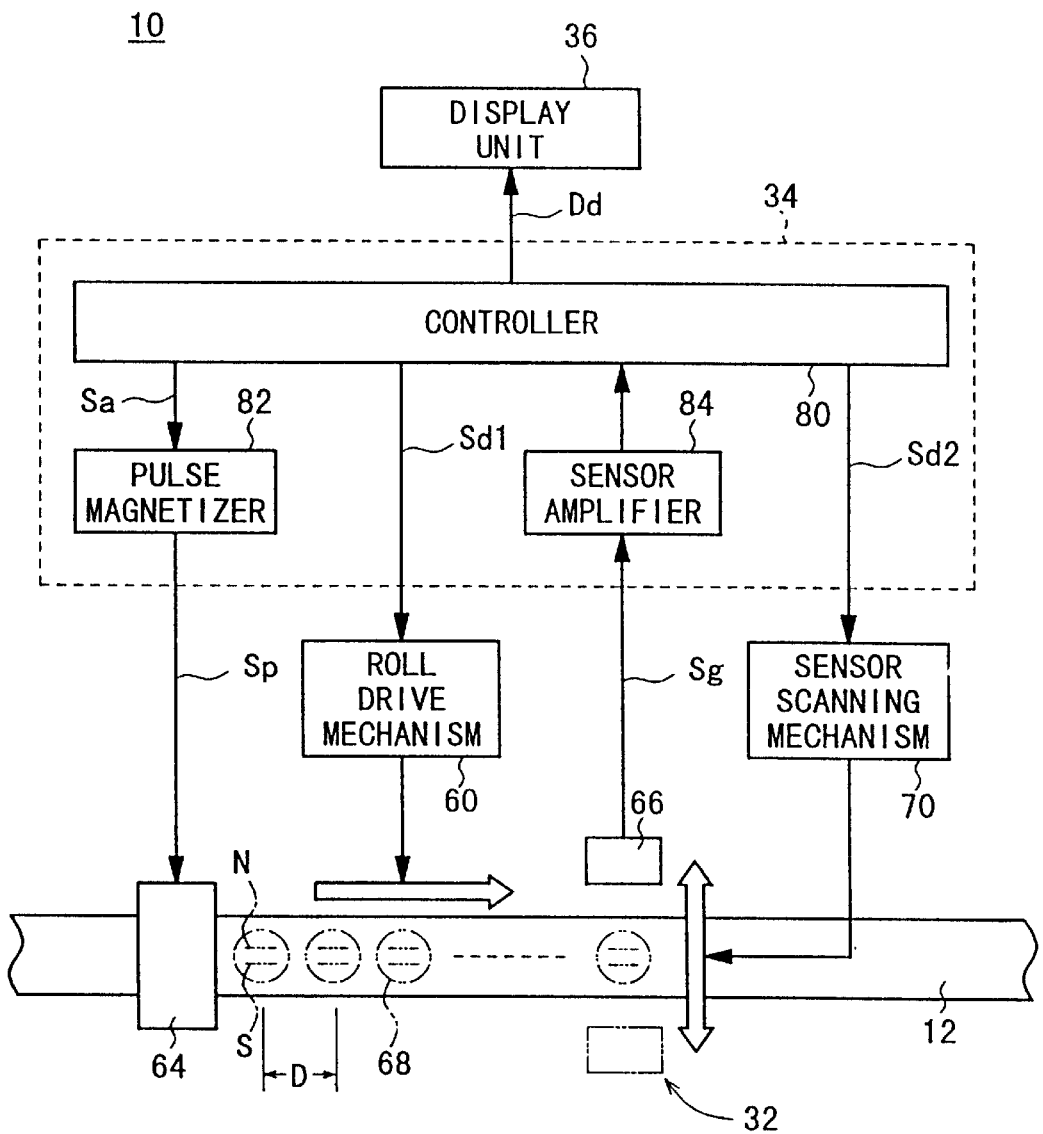
FIG. 3 a block diagram of a control means of the measuring apparatus shown in FIG. 1.

When the roll drive mechanism 60 is actuated to rotate the drive roll 46, the specimen 12 is fed in sliding contact with the inspection table 62 while being guided by the path rolls 40, 42, the presser rolls 50, 52, and the path roll 44 (see FIGS. 1 and 3).

The actuator may be connected to another one of the rolls, e.g., the path roll 40, rather than the drive roll 46.

As shown in FIG. 1, a deadweight W having a certain weight is attached to the trailing end of the specimen 12 to apply a tension of certain intensity to the specimen 12.

With the specimen 12 thus under tension, the specimen 12 is prevented from being displaced toward and away from the inspection table 62 when a magnetization M is detected as described later on. Therefore, the magnetization M can be detected accurately. The feeding device 30 may include a roll for tensioning the specimen 12, rather than the deadweight W.

The detecting device 32 has, in addition to the inspection table 62, a magnetizing head (magnetizing means) 64 and a detecting sensor (detecting means) 66 which are disposed above and in confronting relation to the inspection table 62. As shown in FIG. 3, the magnetizing head 64 is fixedly positioned, and the detecting sensor 66 is displaceable in a direction normal to the direction in which the specimen 12 is fed.

The magnetizing head 64 serves to magnetize the magnetic layer 20 (see FIG. 2) of the specimen 12 that is set on the inspection table 62. The magnetizing head 64 generates a magnetic field of given intensity based on a pulse signal Sp supplied from a pulse magnetizer 82 (see FIG. 3) of the control device 34.

The intensity of the magnetic field generated by the magnetizing head 64 should preferably be about three times the coercive force of the specimen 12. When the magnetic field whose intensity is about three times the coercive force of the specimen 12 is applied to the specimen 12, the magnetic layer 20 of the specimen 12 can be magnetized to a saturated state.

The coercive force of the magnetic layer 20 differs with the kind (composition) of the substance of the magnetic layer 20. In view of this, the intensity of the magnetic field generated by the magnetizing head 64 should preferably be determined based on the maximum value of the coercive forces of various specimens 12 that can be measured by the measuring apparatus 10.

The magnetizing head 64 may comprise a non-contact head capable of magnetizing the specimen 12 out of contact therewith, or a contact head capable of magnetizing the specimen 12 in contact therewith. If the magnetizing head 64 comprises a non-contact head, then since the magnetizing head 64 and the specimen 12 are kept out of contact with each other when the magnetizing head 64 magnetizes the specimen 12, the surface of the specimen 12 is prevented from being degraded by contact with the magnetizing head 64.

As shown in FIG. 3, the specimen 12 has an area 68 magnetized by the magnetizing head 64, and the magnetized area 68 has a pair of linear segments magnetized to N and S poles, respectively. These linear segments extend parallel to each other along the longitudinal direction of the specimen 12.

As shown in FIG. 1, the detecting sensor 66 is disposed downstream of the magnetizing head 64 in the direction in which the specimen 12 is fed, and positioned between the presser rolls 50, 52.

As shown in FIG. 3, a sensor scanning mechanism 70 is connected to the detecting sensor 66 for moving the detecting sensor 66 in directions perpendicular to the direction in which the specimen 12 is fed. When the detecting sensor 66 is moved in directions perpendicular to the direction in which the specimen 12 is fed, the detecting sensor 66 scans the magnetized area 68.

The detecting sensor 66 detects a magnetization M of the magnetized area 68, i.e., the level of intensity to which the area 68 has been magnetized, and supplies a detected signal Sg representing the detected magnetization M to a sensor amplifier 84 of the control device 34.

The detected signal Sg contains positive and negative peaks that are outputted when the detecting sensor 66 scans the linear segments magnetized to the N and S poles of the magnetized area 68. The control device 34 determines the thickness d of the magnetic layer 20 based on a value between the peaks.

The control device 34 comprises a controller (processing means) 80, a pulse magnetizer 82, and a sensor amplifier 84.

The controller 80 is electrically connected to the roll drive mechanism 60 and the sensor scanning mechanism 70. The roll drive mechanism 60 is actuated to feed the specimen 12 in response to a drive command signal Sd1 from the controller 80. The sensor scanning mechanism 70 is actuated to move the detecting sensor 66 in response to a drive command signal Sd2 from the controller 80.

When the pulse magnetizer 82 is supplied with a magnetization command signal Sa from the controller 80, the pulse magnetizer 82 supplies a pulse signal Sp to the magnetizing head 64 based on the magnetization command signal Sa. The magnetizing head 64 generate a magnetic field of given intensity based on the pulse signal Sp from the pulse magnetizer 82.

When the sensor amplifier 84 is supplied with the detected signal Sg representing the magnetization M of the magnetized area 68 of the specimen 12, the sensor amplifier 84 amplifies and supplies the detected signal Sg to the controller 80. The controller 80 then determines the thickness d of the magnetic layer 20 based on the magnetization M of the magnetized area 68 which is indicated by the detected signal Sg from the sensor amplifier 84.

Figure 4:
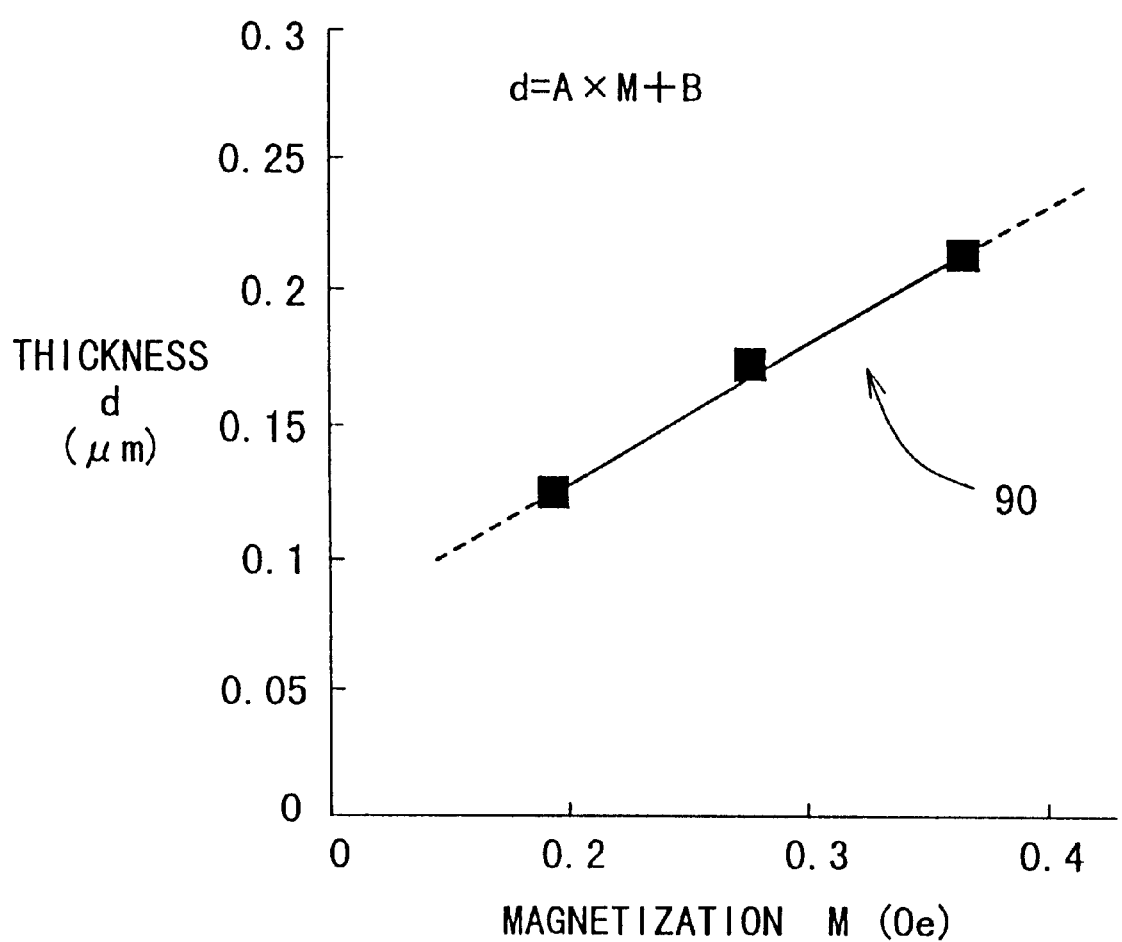
FIG. 4 is a diagram showing a magnetization to magnetic layer thickness conversion table for determining the thickness of a magnetic layer of a specimen based on a magnetization.

Specifically, the controller 80 searches an M·d table (magnetization to magnetic layer thickness conversion table) 90 schematically shown in FIG. 4 to determine the value of the thickness d of the magnetic layer 20.

Figure 5:
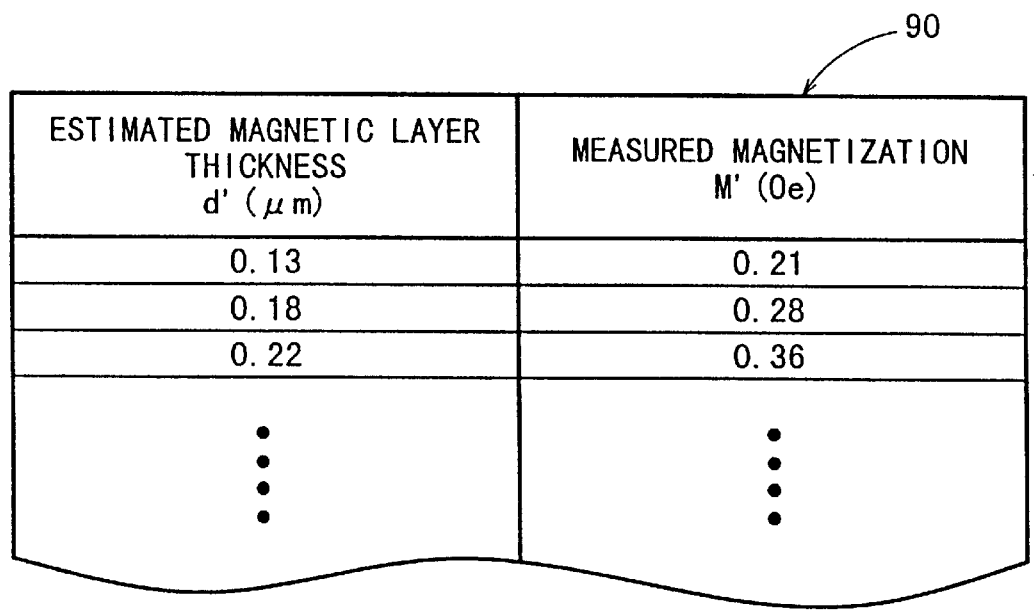
FIG. 5 is a table representing the magnetization to magnetic layer thickness conversion table shown in FIG. 4.

As shown in FIG. 5, the M·d table is prepared based on the relationship between estimated thicknesses d' of the magnetic layer 20 which have been determined by way of experimentation or the like and measured magnetizations M'.

The positions of the symbol n in FIG. 4 correspond to numerical values shown in FIG. 5.

The controller 80 may determine the value of the thickness d of the magnetic layer 20 from the following equation (1) (magnetization to magnetic layer thickness conversion formula) which is derived from the M·d table shown in FIGS. 4 and 5:

$$d = A \times M + B \quad (1)$$

where A and B represent coefficients.

The numerical values shown in FIGS. 4 and 5 are given for illustrative purpose only, and differ with the kind (composition) of the substance of the magnetic layer 20.

The values of the coefficients A, B in the equation (1) also differ with the kind (composition) of the substance of the magnetic layer 20.

As shown in FIG. 3, the controller 30 supplies image data Dd including the value of the thickness d of the magnetic layer 20 determined from the M·d table 90 (see FIGS. 4 and 5) or the equation (1) above to the display unit 36. The display unit 36 then displays information of the thickness d on its display screen 94 (see FIG. 1).

Figure 6:
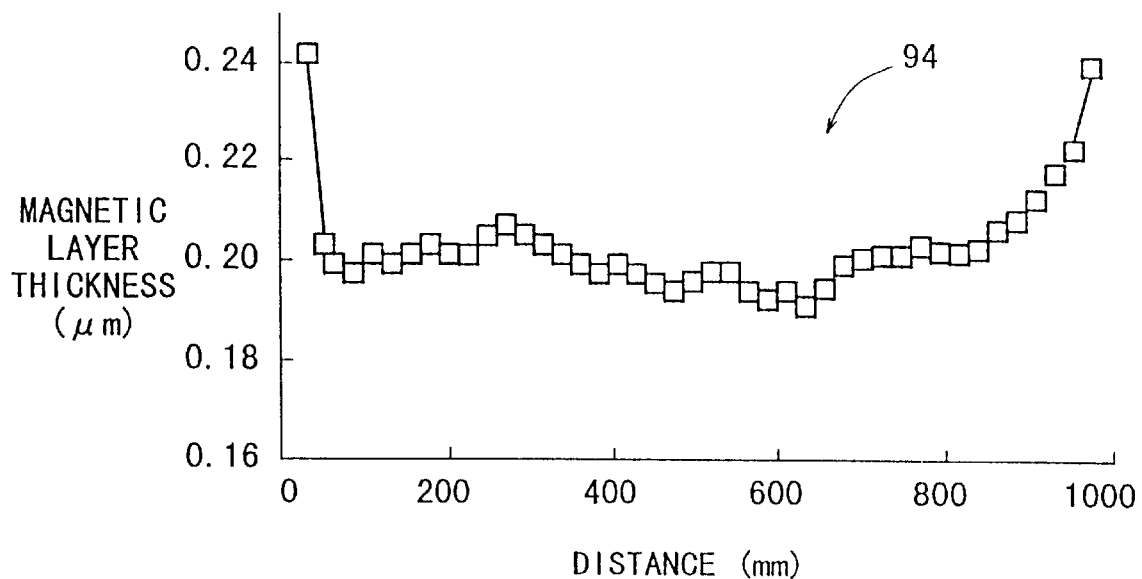
FIG. 6 is a view showing an image displayed on a display unit of the measuring apparatus shown in FIG. 1.

FIG. 6 shows, by way of example, an image representing the information of the thickness d, displayed on the display screen 94 of the display unit 36. The display screen 94 has a horizontal axis representing the distance by which the specimen 12 is fed, and a vertical axis representing the thickness d of the magnetic layer 20 (magnetic layer thickness). On the display screen 94, the thickness d of the magnetic layer 20 determined at a plurality of spots on the specimen 12 as it is fed is displayed as a symbol o, for example.

The observer of the displayed image can easily confirm the distribution of thicknesses d of the magnetic layer 20 along the longitudinal direction of the specimen 12, e.g., the transverse direction of the wide magnetic sheet from which the specimen 12 is cut off.

Figure 7:
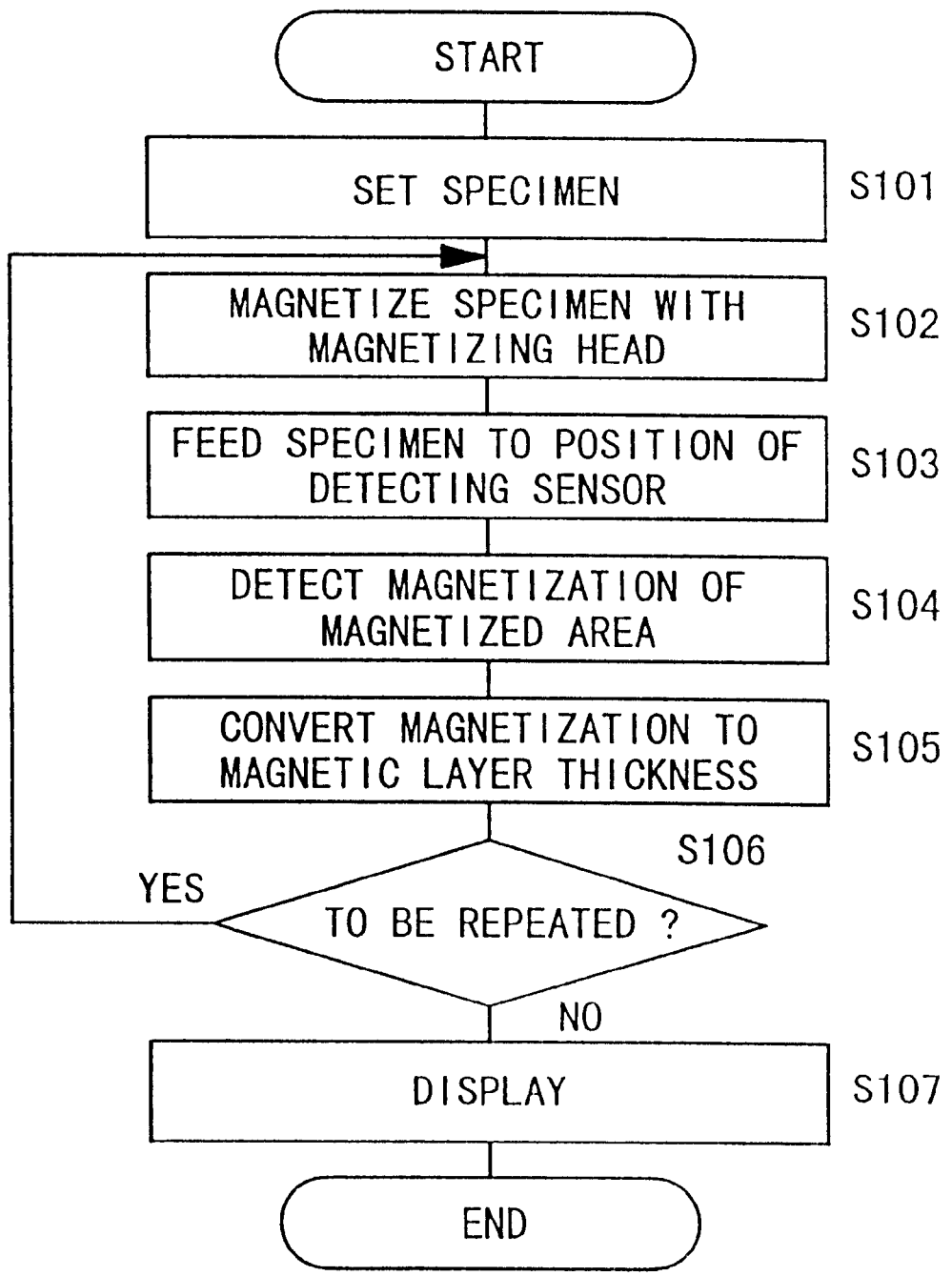
FIG. 7 is a flowchart of a control process for determining the thickness of a magnetic layer, carried out mainly by a controller of the measuring apparatus shown in FIG. 1.

A control process carried out primarily by the controller 80 for determining the thickness d of the magnetic layer 20 will be described below with reference to a flowchart shown in FIG. 7.

The specimen 12 is set on the measuring apparatus 10 in step S101, and the magnetic layer 20 of the specimen 12 is magnetized by the magnetizing head 64 in step S102 (magnetizing step).

In step S103, the specimen 12 is fed a predetermined distance D (e.g., D=6 mm), and then stopped. The predetermined distance D may be entered to the controller 80 from an input device (not shown).

When the specimen 12 is fed the distance D, a magnetized area 68 on the specimen 12 which has been magnetized in step S102 several measuring cycles ago reaches the detecting sensor 66.

In step S104 (detecting step), the detecting sensor 66 scans the magnetized area 68 to detect a magnetization M of the magnetized area 68.

In step S105 (processing step), the controller 80 searches the M·d table 90 (see FIG. 4) or calculates the equation (1) above, based on the magnetization M detected in step S104, for thereby determining the thickness d of the magnetic layer 20.

Thereafter, the controller 80 determines whether the processing of steps S102–S105 needs to be repeated in step S106. The number of times that the processing of steps S102–S105 is to be repeated may be entered to the controller 80 from an input device (not shown).

If the processing of steps S102–S105 needs to be repeated in step S106 (YES), then control returns to step S102. If the processing of steps S102–S105 does not need to be repeated in step S106 (NO), then control proceeds to step S107.

In step S107 (display step), the controller 80 displays information of the thickness d on the display screen 94 of the display unit 36 based on the thickness d of the magnetic layer 20 determined in step S105.

In the first embodiment of the present invention, as described above, the magnetizing head 64 magnetizes the magnetic layer 20 of the specimen 12, and the magnetized area 68 is scanned by the detecting sensor 66 to obtain the magnetization M of the magnetized area 68. The thickness d of the magnetic layer 20 is determined on the basis of the obtained magnetization M. Therefore, the thickness d of the magnetic layer 20 can be determined accurately.

Since the thickness d of the magnetic layer 20 is measured at given distances (intervals) D along the specimen 12. Consequently, the thickness d of the magnetic layer 20 can be determined with a high level of resolution, and the distribution of thicknesses d of the magnetic layer 20 along the specimen 12 can easily be determined.

The above process of measuring the thickness d of the magnetic layer 20 can be performed in a short period of time because it is performed as a non-destructive inspection process.

According to the first embodiment, a state in which the squareness ratio of the magnetic layer 20 is not constant (irregular orientation) can be detected on the basis of variations of the thickness d of the magnetic layer 20 which are displayed on the display screen 94 of the display unit 36 shown in FIG. 6.

A measuring apparatus for measuring the thickness of a magnetic layer according to a modification of the first embodiment will be described below.

Figure 8:
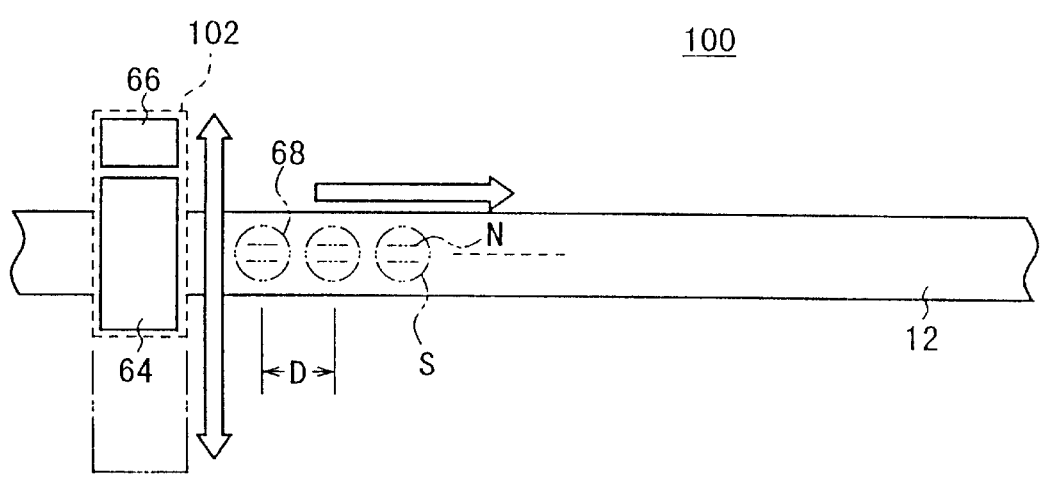
FIG. 8 is a plan view of a measuring apparatus for measuring the thickness of a magnetic layer according to a modification of the first embodiment.

As shown in FIG. 8, the modified measuring apparatus, generally denoted by 100, has a magnetizing head 64 and a detecting sensor 66 which are integrally connected as a unit 102 (indicated by the broken lines) to a sensor scanning mechanism 70 (see FIG. 3).

The specimen 12 can be magnetized by the magnetizing head 64 and the magnetized area 68 of the specimen 12 can be scanned by the detecting sensor 66 when the magnetizing head 64 and the detecting sensor 66 are moved together in a direction perpendicular to the direction in which the specimen 12 is fed.

Inasmuch as the specimen 12 is not fed after the specimen 12 is magnetized by the magnetizing head 64 until the magnetized area 68 is scanned by the detecting sensor 66, the magnetized area 68 can accurately be scanned by the detecting sensor 66.

A measuring apparatus for measuring the thickness of a magnetic layer according to a second embodiment of the present invention will be described below.

Figure 9:
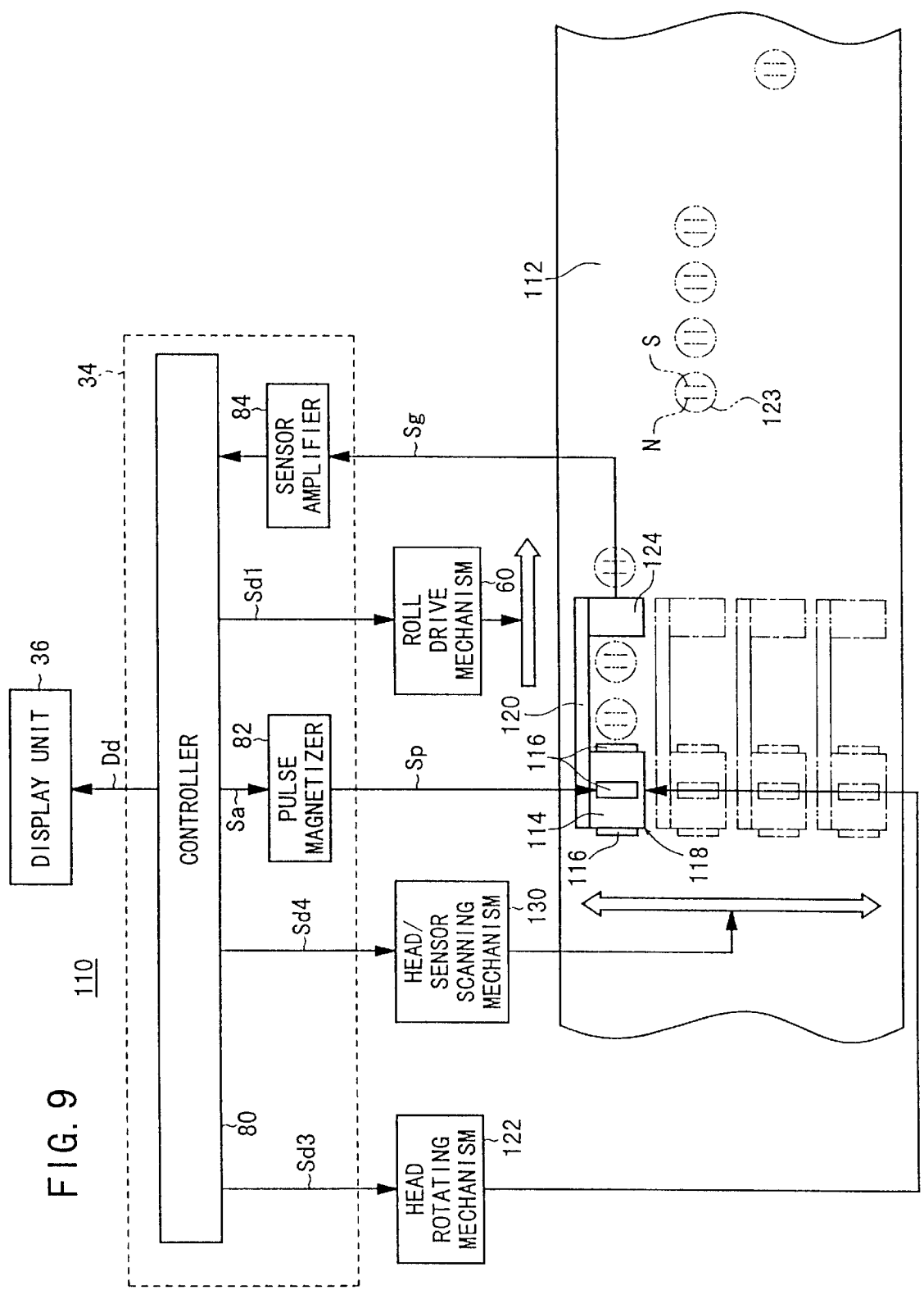
FIG. 9 is a block diagram of a measuring apparatus for measuring the thickness of a magnetic layer according to a second embodiment of the present invention.

FIG. 9 schematically shows the measuring apparatus, generally denoted by 110, according to the second embodiment.

As shown in FIG. 9, the measuring apparatus 110 is arranged to measure the thickness d of a magnetic layer 20 of a wide magnetic sheet (from which narrow magnetic tapes will be cut as products) as a specimen 112. The specimen 112 comprises the same layers as the magnetic tape (specimen) 12 shown in FIG. 2.

Figure 10:
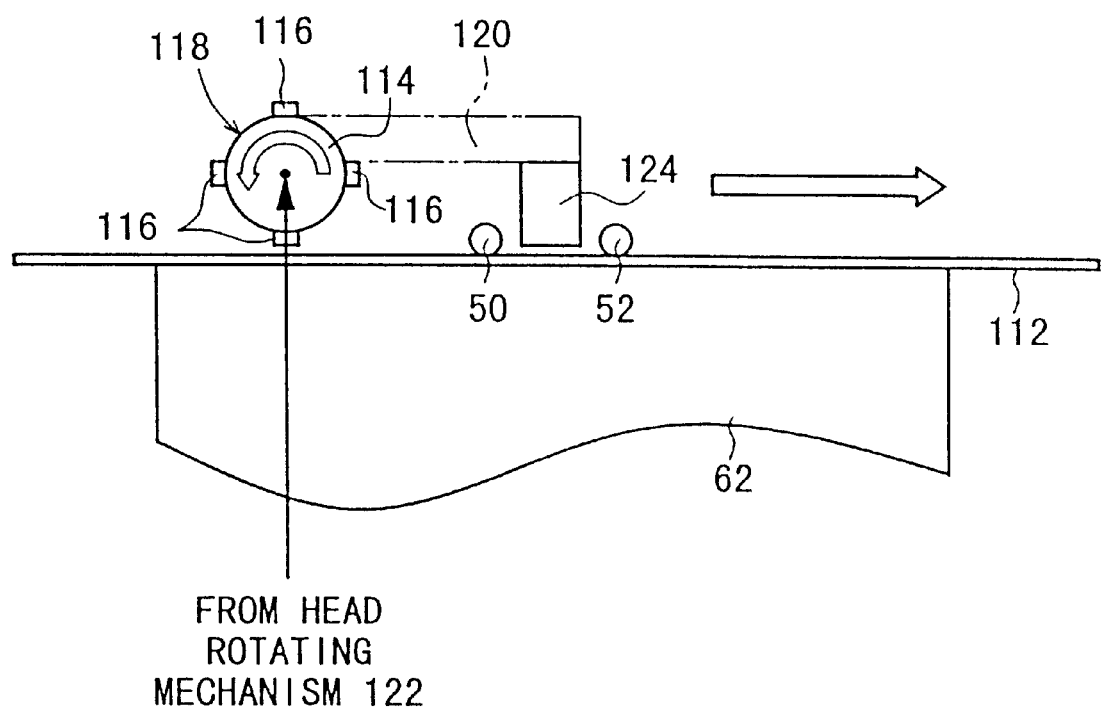
FIG. 10 is a fragmentary front elevational view of the measuring apparatus shown in FIG. 9.

As shown in FIGS. 9 and 10, the measuring apparatus 110 has a cylindrical drum (rotor) 114 and a plurality of (four, for example) head units 118 mounted at regular spaced intervals on the outer circumferential surface of the cylindrical drum 114 and each comprising a magnetizing head (magnetizing means) 116.

The cylindrical drum 114 is supported on a horizontal support arm 120 and is rotatable about its axis which extends perpendicularly to the direction in which the specimen 112 is fed, i.e., parallel to the transverse direction of the specimen 112. The cylindrical drum 114 has a shaft connected to a head rotating mechanism 122 comprising a motor or the like.

The head rotating mechanism 122 is electrically connected to the controller 80. The head rotating mechanism 122 is actuated by a drive command signal Sd3 supplied from the controller 80 to rotate the cylindrical drum 114.

The speed at which the cylindrical drum 114 is rotated is adjusted such that the peripheral speed of outer surfaces of the magnetizing heads 116 mounted on the cylindrical drum 114 is in synchronism with the speed at which the specimen 112 is fed by the roll drive mechanism 60.

The magnetizing heads 116 are supplied with a pulse signal Sp from the pulse magnetizer 82 of the control device 34. Specifically, the pulse magnetizer 82 outputs a pulse signal Sp in timed relation to the arrival of one of the magnetizing heads 116 at a position facing the specimen 112, i.e., a lowermost position in FIG. 10.

As shown in FIG. 9, the magnetizing head 116 at the lowermost position magnetizes the magnetic layer 20 of the specimen 112 to a saturated state based on the supplied pulse signal Sp. At time, a pair of linear segments is magnetized respectively to N and S poles in a magnetized area 123 of the specimen 112. The linear segments extend parallel to each other along the transverse direction of the specimen 112, i.e., the direction perpendicular to the direction in which the specimen 112 is fed. A number of (four, for example) magnetized areas 123 are successively formed on the specimen 112 at intervals depending on the spaced intervals of the magnetizing heads 116 on the cylindrical drum 114.

A detecting sensor (detecting means) 124 is fixed to the support arm 120 downstream of the head unit 118. Like the detecting sensor 66 shown in FIG. 6, the detecting sensor 124 detects a magnetization M of each magnetized area 124 magnetized by the magnetizing head 116, and supplies a detected signal Sg representing the detected magnetization M to the sensor amplifier 84.

As shown in FIG. 9, a head/sensor scanning mechanism 130 is connected to the support arm 120. The head/sensor scanning mechanism 130 is electrically connected to the controller 80 and can be actuated by a drive command signal Sd4 supplied from the controller 80. When actuated by the drive command signal Sd4, the head/sensor scanning mechanism 130 moves the support arm 120, i.e., the head unit 118 and the detecting sensor 124 transversely across the specimen 112.

The controller 80 outputs the drive command signal Sd4 in such timing that the magnetizing head 116 magnetizes the specimen 112 and the detecting sensor 124 detects a magnetization M of the magnetized area 123 in a given position (inspected position) transversely across the specimen 112. The drive command signal Sd4 indicates a next inspected position to which the head unit 118 and the detecting sensor 124 are to be displaced.

Magnetized areas 123 are successively formed in respective positions shifted stepwise in the direction in which the specimen 112 is fed and the transverse direction of the specimen 112. For example, there are four inspected positions or steps along the transverse direction of the specimen 112, and there are four magnetized areas 123 in each of the inspected positions or steps.

The feeding device (feeding means) 30, the display unit 36, the controller 80, the pulse magnetizer 82, and the sensor amplifier 84 are substantially identical in structure to those of the measuring apparatus 10 shown in FIGS. 1 and 3, and will not be described in detail below.

According to the second embodiment, the specimen 112 is magnetized by the magnetizing heads 116 mounted on the drum 114 that is rotated in synchronism with the specimen 112, i.e., at the same speed as the specimen 112 while the specimen 112 is being fed.

Since the linear segments magnetized to N and S poles in each of the magnetized areas 123 on the specimen 112 extend perpendicularly to the direction in which the specimen 112 is fed, the magnetization M is detected while the specimen 112 is being fed.

Accordingly, it is not necessary to alternately feed and stop the specimen 112 for magnetizing the specimen 112 and detecting the magnetization M. Consequently, the process of measuring the thickness d of the magnetic layer 20 of the specimen 112 can be performed in a shorter period of time than with the measuring apparatus 10 according to the first embodiment. As the head unit 118 and the detecting sensor 124 are displaced transversely across the specimen 112, the measuring apparatus 110 can measure the thickness d of the magnetic layer 20 fully across the specimen 112 regardless of the width of the specimen 112.

The measuring apparatus 110 can thus be incorporated in steps for manufacturing magnetic tapes, e.g., such as steps for coating, calendering, and slitting.

A modification of the measuring apparatus 110 according to the second embodiment of the present invention will be described below with reference to FIG. 11.

As shown in FIG. 11, a modified measuring apparatus 150 has a magnetizing head 152 mounted on a support arm 154 for movement in the direction in which the specimen 112 is fed.

Specifically, the magnetizing head 152 is mounted on a rail disposed on the support arm 154 and coupled to a head displacing mechanism (not shown) for displacing the magnetizing head 152 along the rail. The magnetizing head 152 is displaced in synchronism with the specimen 112, i.e., at the same speed as the specimen 112.

As described above, the method of and the apparatus for measuring the thickness of a magnetic layer according to the present invention magnetize the magnetic layer and measures the thickness of the magnetic layer based on a magnetization of the magnetized area. Therefore, the thickness of the magnetic layer can accurately be measured in a short period of time.

Although certain preferred embodiments of the present invention have been shown and described in detail, it should be understood that various changes and modifications may be made therein without departing from the scope of the appended claims.

What is claimed is:

1. A method of measuring a thickness of a magnetic layer, comprising the steps of:
   magnetizing said magnetic layer of a magnetic recording medium to a saturated state;
   detecting a magnetization of a magnetized area of said magnetic recording medium; and
   determining said thickness of said magnetic layer from the detected magnetization.

2. A method according to claim 1, further comprising the step of:
   displaying the determined thickness of said magnetic layer.

3. A method according to claim 1, wherein said step of determining comprises the step of determining the thickness of said magnetic layer based on a magnetization to magnetic layer thickness conversion formula or a magnetization to magnetic layer thickness conversion table.

4. A method according to claim 3, wherein said magnetization to magnetic layer thickness conversion formula comprises a linear function representing the relationship between said magnetization and the thickness of said magnetic layer.

5. A method according to claim 2, wherein said step of determining comprises the step of determining the thickness of said magnetic layer based on a magnetization to magnetic layer thickness conversion formula or a magnetization to magnetic layer thickness conversion table.

6. A method according to claim 5, wherein said magnetization to magnetic layer thickness conversion formula comprises a linear function representing the relationship between said magnetization and the thickness of said magnetic layer.

7. An apparatus for measuring a thickness of a magnetic layer, comprising:
   magnetizing means for magnetizing said magnetic layer of a magnetic recording medium to a saturated state;
   detecting means for detecting a magnetization of a magnetized area of said magnetic recording medium; and
   processing means for determining said thickness of said magnetic layer from the detected magnetization.

8. An apparatus according to claim 7, further comprising:
   a feeding device for feeding said magnetic recording medium through said measuring apparatus for measuring said thickness of said magnetic layer.

9. An apparatus according to claim 8, wherein said magnetizing means is fixedly positioned, said detecting means being displaceable in a direction perpendicularly to the direction in which said magnetic recording medium is fed.

10. An apparatus according to claim 8, wherein said magnetizing means and said detecting means are displaceable in a direction perpendicularly to the direction in which said magnetic recording medium is fed.

11. An apparatus according to claim 8, wherein said magnetizing means is being displaceable in a direction perpendicularly to the direction in which said magnetic recording medium is fed, at the same speed as said magnetic recordinig medium, said detecting means being fixedly positioned with respect to the direction in which said magnetic recording medium is fed.

12. An apparatus according to claim 11, wherein said magnetizing means and said detecting means are displaceable in a direction perpendicularly to the direction in which said magnetic recording medium is fed.

13. An apparatus according to claim 11, further comprising:
   a rotor rotatable at the same speed as said magnetic recording medium, said magnetizing means being mounted on said rotor.

14. An apparatus according to claim 13, wherein said magnetizing means and said detecting means are displaceable in a direction perpendicularly to the direction in which said magnetic recording medium is fed.

15. An apparatus according to claim 7, further comprising:
   display means for displaying the thickness of said magnetic layer determined by said processing means.

16. An apparatus according to claim 8, further comprising:
   display means for displaying the thickness of said magnetic layer determined by said processing means.

17. An apparatus according to claim 7, wherein said processing means comprises means for determining the thickness of said magnetic layer based on a magnetization to magnetic layer thickness conversion formula or a magnetization to magnetic layer thickness conversion table.

18. An apparatus according to claim 17, wherein said magnetization to magnetic layer thickness conversion formula comprises a linear function representing the relationship between said magnetization and the thickness of said magnetic layer.

19. An apparatus according to claim 8, wherein said processing means comprises means for determining the thickness of said magnetic layer based on a magnetization to magnetic layer thickness conversion formula or a magnetization to magnetic layer thickness conversion table.

20. An apparatus according to claim 19, wherein said magnetization to magnetic layer thickness conversion formula comprises a linear function representing the relationship between said magnetization and the thickness of said magnetic layer.

* * * * *